United States Patent
Lewis et al.

(10) Patent No.: US 10,653,937 B2
(45) Date of Patent: May 19, 2020

(54) POSITION-BASED LASER RANGE FINDER

(71) Applicant: Garmin Switzerland GmbH, Schaffhausen (CH)

(72) Inventors: Robert A. Lewis, Bend, OR (US); Dennis O. Corey, Bend, OR (US)

(73) Assignee: Garmin Switzerland GmbH (CH)

( * ) Notice: Subject to any disclaimer, the term of this patent is extended or adjusted under 35 U.S.C. 154(b) by 300 days.

(21) Appl. No.: 15/445,484

(22) Filed: Feb. 28, 2017

(65) Prior Publication Data
US 2017/0354858 A1  Dec. 14, 2017

Related U.S. Application Data

(60) Provisional application No. 62/349,891, filed on Jun. 14, 2016.

(51) Int. Cl.
| | | |
|---|---|---|
| A63B 71/06 | (2006.01) | |
| A63B 57/00 | (2015.01) | |
| A63B 69/36 | (2006.01) | |
| G01S 17/06 | (2006.01) | |
| G01S 17/08 | (2006.01) | |
| G01S 17/88 | (2006.01) | |
| G01S 7/48 | (2006.01) | |
| G01S 17/86 | (2020.01) | |
| A63B 102/32 | (2015.01) | |

(52) U.S. Cl.
CPC .......... *A63B 71/0622* (2013.01); *A63B 57/00* (2013.01); *A63B 69/36* (2013.01); *G01S 7/4808* (2013.01); *G01S 17/06* (2013.01); *G01S 17/08* (2013.01); *G01S 17/86* (2020.01); *G01S 17/88* (2013.01); *A63B 2071/0625* (2013.01); *A63B 2071/0691* (2013.01); *A63B 2102/32* (2015.10); *A63B 2220/12* (2013.01); *A63B 2220/13* (2013.01); *A63B 2220/18* (2013.01); *A63B 2220/40* (2013.01); *A63B 2220/80* (2013.01); *A63B 2220/806* (2013.01); *A63B 2225/20* (2013.01)

(58) Field of Classification Search
CPC ........ G01S 19/26; G01S 19/34; G01S 17/023; G01S 19/19
See application file for complete search history.

(56) References Cited

U.S. PATENT DOCUMENTS

| | | | |
|---|---|---|---|
| 5,046,839 A | 9/1991 | Krangle | |
| 6,023,322 A * | 2/2000 | Bamberger | G01C 3/08 356/5.01 |
| 8,314,923 B2 | 11/2012 | York et al. | |
| 8,460,111 B2 | 6/2013 | Hart | |

(Continued)

*Primary Examiner* — Luke D Ratcliffe
(74) *Attorney, Agent, or Firm* — Samuel M. Korte; Max M. Ali

(57) ABSTRACT

Techniques are provided for implementing a system for determining the range to a target object and orienting a map. In implementations, GPS data is used to determine the location of the system and an approximate distance from that location to the target. Based on the approximate distance, one or more parameters of operation of the system may be set. Modes of operation may be entered to further adjust parameters of operation. An optical pulse may then be projected at the target and its reflections collected and analyzed to calculate a distance measurement. A visual display may be adjusted based on the calculated distance estimate to the target.

19 Claims, 9 Drawing Sheets

(56) References Cited

U.S. PATENT DOCUMENTS

| | | |
|---|---|---|
| 2007/0171394 A1 | 7/2007 | Steiner et al. |
| 2012/0105475 A1* | 5/2012 | Tseng ................. G01C 21/3611 |
| | | 345/633 |
| 2012/0109577 A1* | 5/2012 | Nyhart .................... G01C 3/08 |
| | | 702/159 |
| 2015/0196822 A1 | 7/2015 | Voutilainen et al. |
| 2017/0010359 A1 | 1/2017 | Jung |
| 2017/0031030 A1* | 2/2017 | Verdugo ............... G01S 17/023 |

* cited by examiner

POSITION-BASED LASER RANGE FINDER

RELATED APPLICATIONS

This non-provisional patent application claims priority benefit, with regard to all common subject matter, of earlier-filed U.S. Provisional Patent Application No. 62/349,891, filed on Jun. 14, 2016, and entitled "Improved Golf Laser Rangefinder." The identified earlier-filed provisional patent application is hereby incorporated by reference in its entirety into the present application.

BACKGROUND

Optical laser rangefinders are often used by golfers to measure distance to a flagstick or other hole features. In most situations, the general location of the green is static, and thus may be contained in cartographic data, but the exact location of the hole on the green changes from day to day. Accurately measuring the distance to a flagstick in the hole can be difficult for a number of reasons, including the small cross-sectional area of the flagstick for targeting, a significant distance between a user and the hole, hand jitter of the user, or the obscuring effect of environmental objects such as trees.

SUMMARY

Embodiments provide an optical rangefinder system that provides a user with an estimation of the position of a target. A first embodiment includes a system for determining a position of a target comprising a rangefinder, a communications module, a display, a memory unit storing a set of cartographic data, and one or more processors. The processor(s) are operable to obtain the geographic location of the system from the communications module, determine an approximate range envelope to the target, adjust an operating parameter of the system based on that range envelope, performing a rangefinding operation based on the adjusted operating parameter, and display the range estimate on the display. The rangefinder includes a transmitter operable to emit one or more pulses towards the target and a receiver operable to receive reflections of the pulses. The communications module may be a GPS receiver or may communicate with a GPS receiver housed in a mobile electronic device.

For example, using a device comprising a GPS receiver, a heading sensor, and cartographic data corresponding to a hole, an embodiment uses the GPS sensed location and cartographic data to determine a maximum and minimum range to a target flagstick. The device may then perform a laser measurement of the distance to the flagstick, using the maximum and minimum ranges to filter out signals reflected from objects in the foreground or background.

In a second embodiment, a system for determining a position of a target comprises a rangefinder, a communications module, a display, a memory unit storing a set of cartographic data, and one or more processors. The system may further include an orientation determining component, such as a compass heading sensor, which is operable to determine the orientation of the system. The one or more processors may cause the system to enter a mode of operation based on a user activation, the geographic location, and/or the sensed orientation of the device. One or more operating parameters of the system may be adjusted by the one or more processors based on the mode of operation and/or an approximate range to the target. The processor(s) are operable to calculate a range estimate of the target using the rangefinder based on the adjusted operating parameters and display the range estimate on the display. The modes of operation may correspond to a scanning, holding, aiming, or target seek function of the system.

In a third embodiment, a system for determining a position of a target comprises a rangefinder, a communications module, an orientation determining component, a display, a memory unit storing a set of cartographic data, and one or more processors. The one or more processors may cause the system to enter a target seek mode based on the geographic location and the orientation of the system. One or more operating parameters of the system may be adjusted by the one or more processors based on the target seek mode and/or an approximate range to the target. The processor(s) are operable to calculate a range estimate of the target using the rangefinder based on the adjusted operating parameters and display the range estimate on the display. The system may further comprise a camera, which the one or more processors may utilize to capture an image of the proximity of the target and search pixels in that image for information indicative of the target.

BRIEF DESCRIPTION OF THE DRAWING FIGURES

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

DETAILED DESCRIPTION

Overview

The following text sets forth a detailed description of numerous different embodiments. However, it should be understood that the detailed description is to be construed as exemplary only and does not describe every possible embodiment since describing every possible embodiment would be impractical. In light of the teachings and disclosures herein, numerous alternative embodiments may be implemented.

Figure 1:
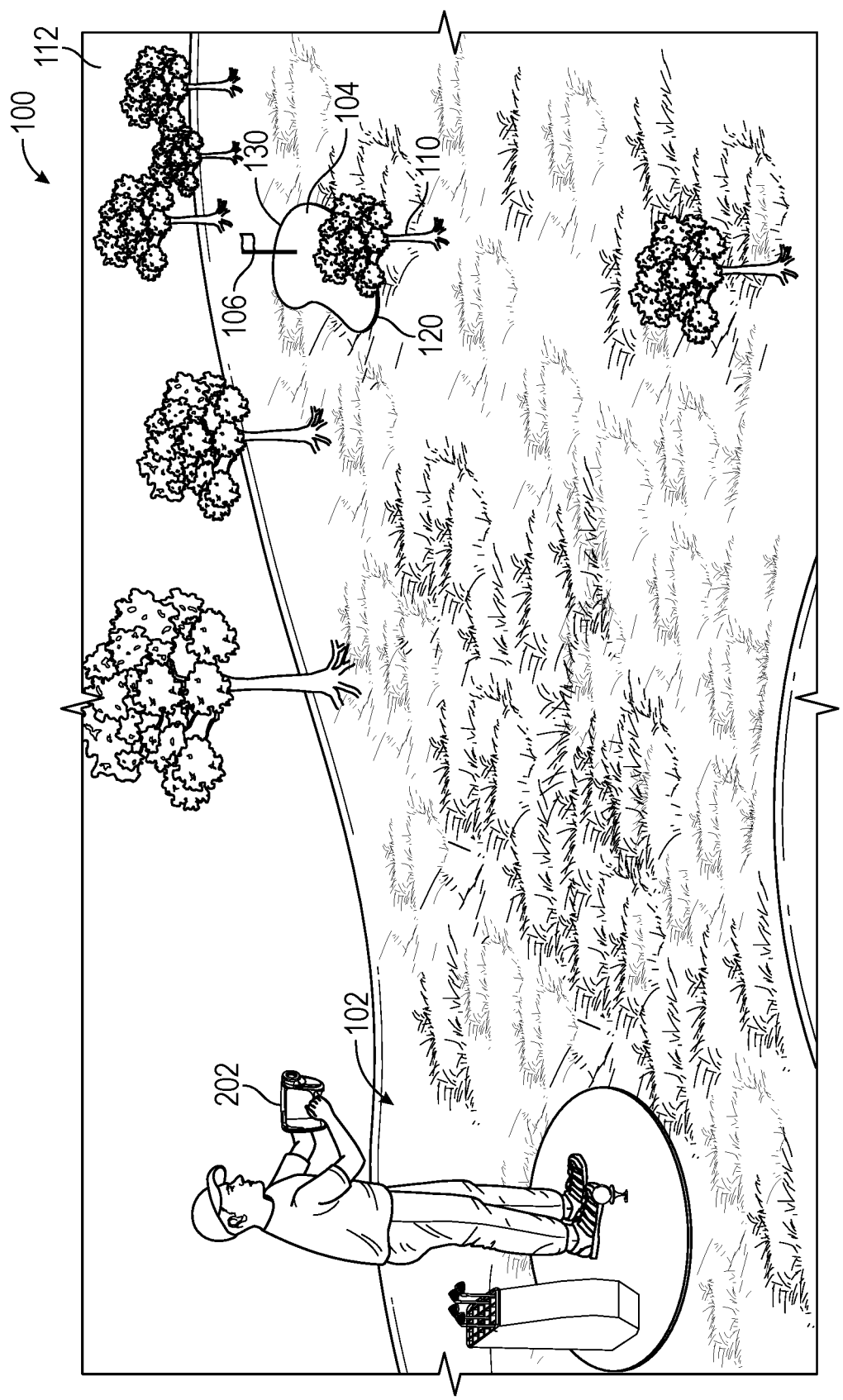
FIG. 1 illustrates an exemplary golfing situation in which embodiments of the system may be used.

Embodiments are disclosed describing an optical-based rangefinding system for use in conjunction with cartographic data. As seen in FIG. 1, the system may include one or more electronic targeting devices 202 operated by a user to determine the distance to and/or position of a target 106, such as the flagstick of a golf hole. Embodiments may use stored information related to a proximity of the target, such as green 104, to reduce the impact of signals from unintended targets, such as trees 110 and 112. As used in this description, the term "flagstick" is intended to include both the flag and pole portions of the flag placed in a golf hole.

Embodiments of systems disclosed may include one or more processors operable to calculate a range estimate of the target by performing a rangefinding operation with a rangefinder component having an optical transmitter and receiver. The optical transmitter is operable to transmit one or more pulses of a light beam towards a target. The rangefinding operation is based, at least in part, on one or more operating parameters that are determined by the system based on the cartographic data 214 and the sensed geographic location of the system.

The cartographic data 214 may include a map of the proximity of the system 200 and the target 106. Cartographic data 214 may include cardinal directions, elevations, or any other navigation or orientation data. The cartographic data 214 may further include, in some embodiments, an approximate range envelope of the target. For example, when used for rangefinding of a target golf flagstick, the cartographic data 214 may include data indicating the position of the green, hazards, tees, or any other location of interest for a particular hole or golf course.

The exact location of a hole on a green is variable from day to day, but it will usually be somewhere within the boundaries of the green. Thus, cartographic data 214 stored in memory 212 may include a range envelope for possible positions of the hole based on data indicating green locations and the sensed geographic position of the system. The range envelope may, for example, be defined by a maximum and minimum range from the geographic location of the system. Based on the range envelope, an operating parameter may be adjusted before, during, and/or after emitting one or more pulses from a transmitter portion of the rangefinder and subsequent reception of the reflections of the pulses by a receiver portion of the rangefinder to improve and/or speed an estimation of the distance to the target.

The system may, in some embodiments, collect a plurality of range estimates of the range to the target and output a final range estimate to the user via a display when a threshold number of the range estimates agree on a particular range estimate. The threshold number that must agree may be set by any means, such as manually by a user, by a remote control of the system from a remote location, from data stored in memory, or by a process performed by one or more processors of the system.

One or more modes may be entered by the system manually and/or automatically based on sensed values such as the geographic location of the system and/or a sensed orientation of the system to further adjust the one or more operating parameters. In some embodiments, modes of operation may account for a use of the system, a movement pattern, and/or may provide targeting assistance to a user of the system.

Hardware

Figure 2:
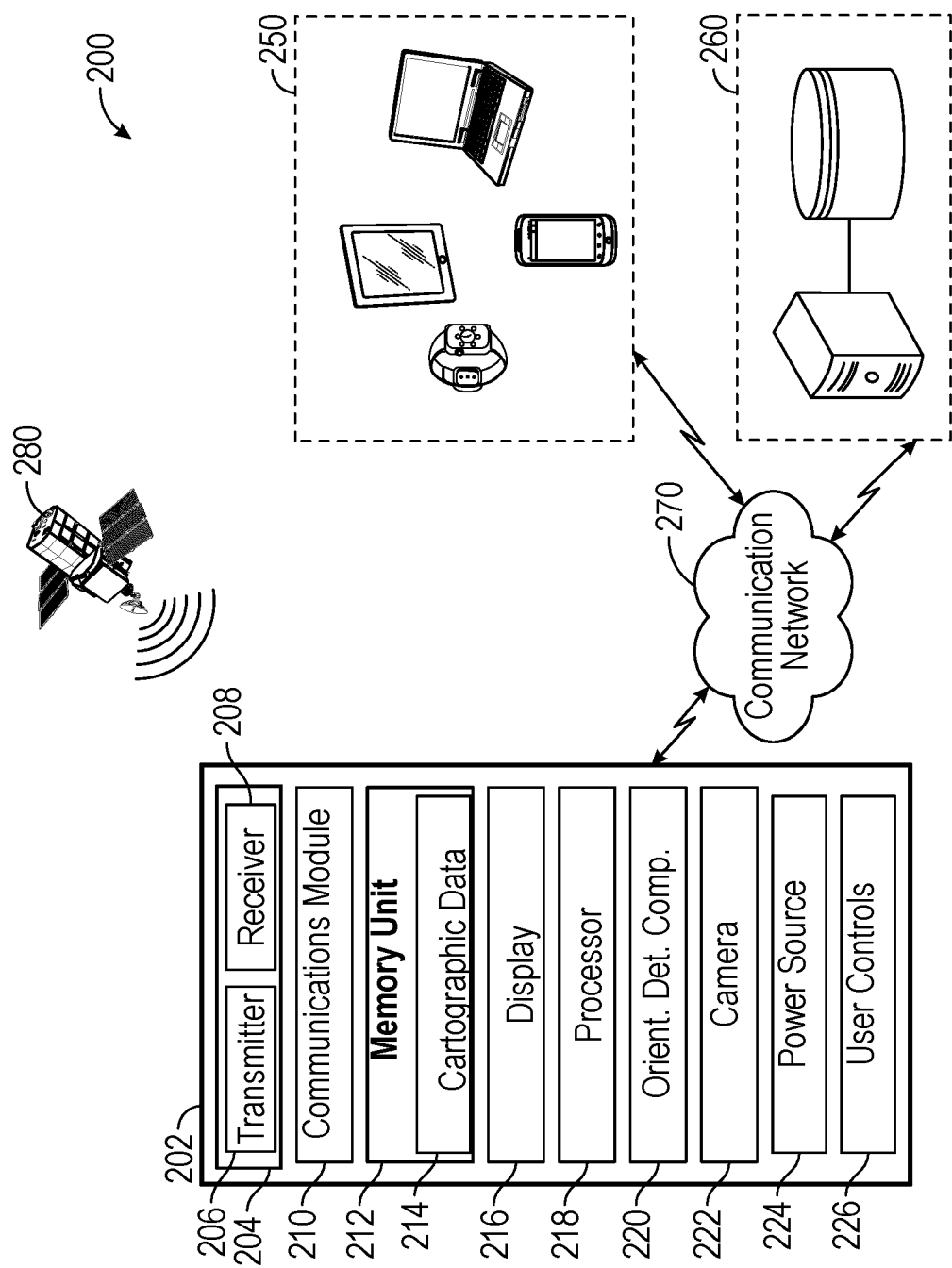
FIG. 2 is a schematic illustration of an exemplary position and distance measurement system 200 in accordance with an embodiment of the disclosure.

FIG. 2 is an illustration of a block diagram of an exemplary rangefinding system 200 in accordance with an embodiment of the disclosure.

In some embodiments, targeting device 202 may act as a standalone electronic device and not require communications with external computing devices such as mobile device 250 or remote server 260. In other embodiments, which are further discussed below, targeting device 202 may communicate with and/or work in conjunction with one or more of external computing devices 250 and/or 260.

Targeting device 202, one or more mobile devices 250, and/or one or more remote servers 260 may be configured to communicate with one another using any suitable number of communication networks and wired and/or wireless links (e.g., communication network 270, wired and/or wireless links, etc.) in conjunction with any suitable number and type of communication protocols.

In an embodiment, one or more of mobile devices 250 and/or remote servers 260 may include any suitable number and/or type of computing devices configured to communicate with and/or exchange data with targeting device 202. For example, one or more of mobile devices 250 may be implemented as a handheld computing device (e.g., smartphone, tablet, laptop, netbook, notebook, pager, personal digital assistant (PDA), wearable computing device, smart glasses, a smart watch or a bracelet, etc.), or any other suitable type of computing device capable of wired and/or wireless communication, while one or more of remote servers 260 may be implemented as one or more cloud data services, web servers, databases, etc.

In an embodiment, targeting device 202 may communicate with one or more of mobile devices 250 and/or remote servers 260 to send data to and/or to receive data from mobile devices 250 and/or remote servers 260. For example, targeting device 202 may communicate with one or more mobile devices 250 to receive updated cartographic data 214. To provide another example, targeting device 202 may communicate with one or more remote servers 260 to receive golf course data and/or to send data collected, measured, and/or generated by targeting device 202 to remote servers 260 (e.g., geographic position data, orientation data, etc., as further discussed below).

Communication network 270 may include any suitable number of nodes, additional wired and/or wireless networks, etc., in various embodiments. For example, in an embodiment, communication network 270 may be implemented with any suitable number of base stations, landline connections, internet service provider (ISP) backbone connections, satellite links, public switched telephone network (PSTN) connections, local area networks (LANs), metropolitan area networks (MANs), wide area networks (WANs), any suitable combination of local and/or external network connections, etc. To provide further examples, communication network 270 may include wired telephone and/or cable hardware, satellite, cellular phone communication networks, etc. In various embodiments, communication network 270 may provide targeting device 202 with connectivity to network services, such as Internet services, for example.

Communication network 270 may be configured to support communications between targeting device 202 and remote server 260 in accordance with any suitable number and/or type of wired and/or wireless communication protocols. Examples of suitable communication protocols may include personal area network (PAN) communication protocols (e.g., BLUETOOTH), Wi-Fi communication protocols, radio frequency identification (RFID) and/or a near field communication (NFC) protocols, cellular communication protocols, Internet communication protocols (e.g., Transmission Control Protocol (TCP) and Internet Protocol (IP)), etc.

In another embodiment, targeting device 202 need not communicate with one or more of mobile devices 250 and/or remote server 260. For example, targeting device 202 may operate as a standalone rangefinding, positioning, and navigation device that is carried and operated by a user to perform various functions.

Targeting device 202 may be implemented as any suitable type of portable and/or mobile electronic device configured to function as a rangefinding and target positioning system. Embodiments include targeting device 202 implementing any suitable combination of these functions. Targeting device 202 may implement some of these functions without implementing others.

In an embodiment, targeting device 202 may include a rangfinder 204, a communications module 210, a memory unit 212, a display 216, one or more processors 218, and orientation determining component 220, and a camera 222. Targeting device 202 may further include a power source 224 and/or User Controls 226. Targeting device 202 may include additional elements such as, for example, memory controllers, memory card slots, ports, interconnects, etc., which are not described herein for purposes of brevity.

Communications module 210 may be configured to support any suitable number and/or type of communication protocols to facilitate communications between targeting device 202 and one or more of mobile devices 250 and/or remote server 260. Communications module 210 may be configured to receive any suitable type of information via one or more of mobile devices 250 and/or remote server 260. Communications module 210 may be implemented with any suitable combination of hardware and/or software to facilitate this functionality. For example, communications module 210 may be implemented with any number of wired and/or wireless transceivers, ports, connectors, antennas, etc.

Communications module 210 may be configured to facilitate communications with various mobile devices 250 and/or servers 260 using different types of communication protocols. For example, communications module 210 may communicate with a mobile computing device via a wireless Bluetooth communication protocol (e.g., via wireless link) and with a laptop or a personal computer via a wired universal serial bus (USB) protocol (e.g., via a wired link). To provide another example, communications module 210 may communicate with a traffic aggregation service via network 270 using a wireless cellular protocol. Communications module 210 may be configured to support simultaneous or separate communications between two or more of mobile devices 250 and/or remote servers 260.

As further discussed below, a user interface 502 may be configured to facilitate user interaction with targeting device 202 and/or to provide feedback to a user. In an embodiment, a user may interact with user interface 502 to change various modes of operation, to initiate certain functions, to modify settings, set options, etc., which are further discussed below.

For example, user interface 502 may include a user-input device such as an interactive portion of display 216 (e.g., a "soft" keyboard, buttons, etc.) displayed on display 216, physical buttons integrated as part of user controls 226 of targeting device 202 that may have dedicated and/or multi-purpose functionality, etc. To provide another example, user interface 402 may cause visual alerts or icons to be displayed via display 216 and/or audible alerts to be sounded. Audible alerts may be sounded using any suitable device, such as a buzzer, speaker, etc., which are not shown in FIG. 2 for purposes of brevity.

Display 216 may be implemented as any suitable type of display configured to facilitate user interaction, such as a capacitive touch screen display, a resistive touch screen display, etc. In various aspects, display 216 may be configured to work in conjunction with user controls 226 and/or processor 218 to detect user inputs upon a user selecting a displayed interactive icon or other graphic, to identify user selections of objects displayed via display 216, etc. In alternative embodiments, display 216 is not configured to accept user interaction, and is merely used as a visual output device. In such cases, user control of the device may be achieved, for example, using user controls 226 and or controlled remotely from a mobile device 250 and/or remote server 260.

In some embodiments, communications module 210 may be configured to utilize any suitable communications protocol to facilitate determining a geographic location of targeting device 202. For example, communications module 210 may be configured to communicate with one or more satellites 280 and/or wireless transmitters in accordance with a Global Navigation Satellite System (GNSS) protocol, to determine a geographic location of targeting device 202, and to generate geographic location data. Wireless transmitters are not illustrated in FIG. 2, but may include, for example, one or more base stations implemented as part of communication network 270.

For example, communications module 210 may be configured to utilize "Assisted Global Positioning System" (A-GPS), by receiving communications from a combination of base stations (that may be incorporated as part of communication network 270) and/or one or more from satellites 280. Examples of suitable global positioning communications protocol may include Global Positioning System (GPS), the GLONASS system operated by the Russian government, the Galileo system operated by the European Union, the BeiDou system operated by the Chinese government, etc.

Additionally or alternatively, in embodiments communications module 210 may receive a geographic location of the system 200 from one or more mobile devices 250. Each or any of the mobile devices 250 may be configured to utilize any suitable communications protocol to facilitate determining a geographic location, as described above. In a particular example, a mobile device 250 may be a smart phone of the user 102 that determines the geographic location of the system via an integrated GPS receiver, and is operable to transmit that geographic location to the targeting device 202 via communications module 210. This is intended only as example, and is not intended to be limiting. Any sort of location capturing technique performed through the use of communications module 210 is intended for inclusion within embodiments.

Processor 218 may be implemented as any suitable type and/or number of processors, such as a host processor of targeting device 202, for example. To provide additional examples, processor 218 may be implemented as an application specific integrated circuit (ASIC), an embedded processor, a central processing unit (CPU) associated with targeting device 202, a graphical processing unit (GPU), etc. Processor(s) 218 may be configured to communicate with one or more of communications module 210, a memory unit 212, a display 216, rangefinder 204, camera 222, and orientation determining component 220, via one or more wired and/or wireless interconnections, such as any suitable number of data and/or address buses, for example. These interconnections are not shown in FIG. 2 for purposes of brevity.

Processor 218 may be configured to operate in conjunction with one or more of communications module 210, a memory unit 212, a display 216, and orientation determining component 220, to process and/or analyze data, to store data to memory unit 212, to retrieve data from memory unit 212, to display information on display 110, to receive, process, and/or interpret signals from rangefinder 204, to process user interactions via user controls 226, to receive and/or analyze live video data captured via camera 222, to receive data from and/or send data to one or more of mobile devices 250 and/or remote server 260, etc.

In accordance with various embodiments, memory unit 212 may be a computer-readable non-transitory storage device that may include any suitable combination of volatile memory (e.g., a random access memory (RAM) or non-volatile memory (e.g., battery-backed RAM, FLASH, etc.). Memory unit 212 may be configured to store instructions executable on processor 218, such as the various memory modules illustrated in FIG. 2 and further discussed below, for example. These instructions may include machine-readable instructions that, when executed by processor 218, cause processor 218 to perform various acts as described herein. Memory unit 212 may also be configured to store any other suitable data used in conjunction with targeting device 202, such as data received from one or more of mobile devices 250 and/or remote server 260 via communications module 210, range estimates from rangefinder 204 and information processed by processor 218, image data from camera 222, cartographic data 214, data indicative of target locations and range envelopes by geographic location, etc.

Memory unit 212 may include a first portion implemented as integrated, non-removable memory and a second portion implemented as a removable storage device, such as a removable memory card. For example, memory unit 212 may include a SD card that is removable from targeting device 202 and a flash memory that is not removable from targeting device 202. Data may be transferred from a first portion of memory unit 212 (e.g., buffered live camera data) to a second portion of memory unit 212, thereby allowing a user to remove a portion of memory unit 212 to access viewing data stored thereon on another device.

Orientation determining component 220 may include one or more inclinometers, gyroscopes, accelerometers, etc. In embodiments, orientation determining component 220 may include a compass heading sensor, dead reckoning system, altimeter, or any other instrumentation that may be operable to provide information to processor 218 indicative of the orientation of targeting device 202. Alternatively, images captured by camera 222 could be used to provide orientation data to processor 218 in embodiments.

Figure 3:
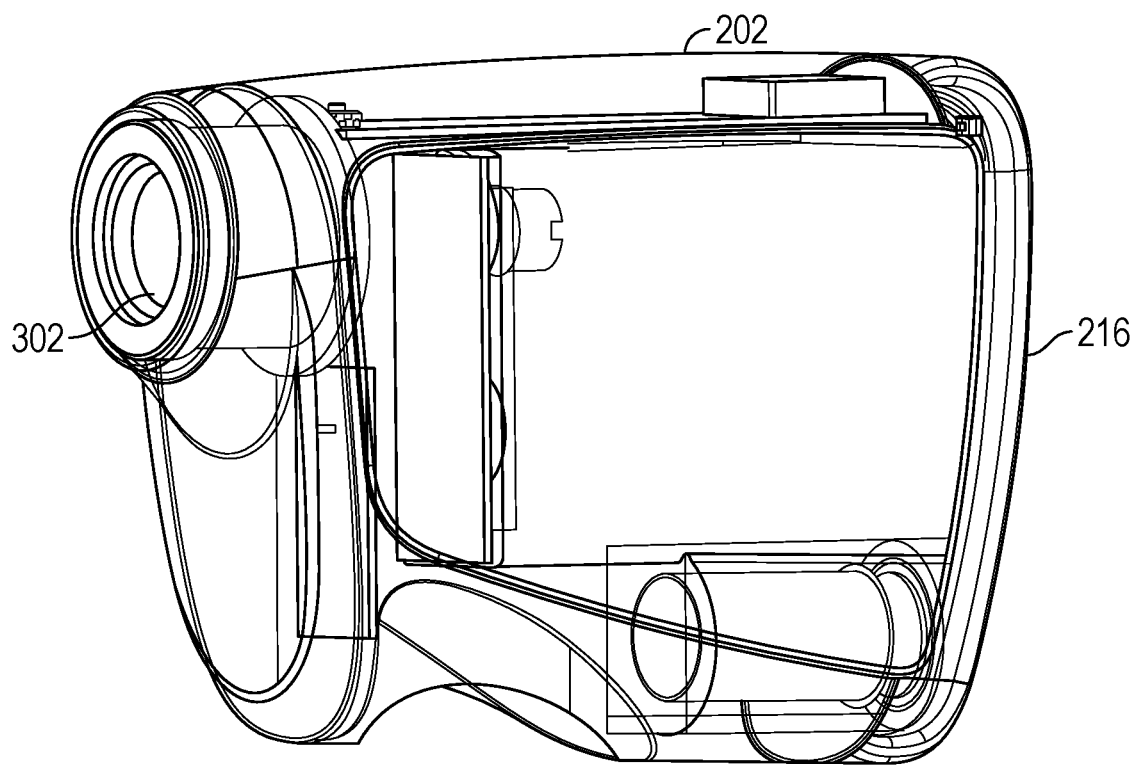
FIG. 3 is a perspective illustration of one embodiment of a targeting device.

FIG. 3 shows a perspective view of an example targeting device 202 that may be included in embodiments. The embodiment of FIG. 3 is intended for example only, and is not intended to be limiting. The targeting device 202 may be alternatively embodied as a digital camera, incorporated into a handheld communication device or gun-like housing, or may be shaped as any other form and/or included as part of any other electronic device. In the embodiment shown in FIG. 3, a lens assembly 302 is provided for targeting a target, projecting one or more pulses, receiving reflections of the one or more pulses, and in some embodiments capturing an image of the scene including the target and its proximity with a digital camera. In some embodiments, any of these functions may be performed by separate lens assemblies, while in other embodiments some of these functions may be omitted altogether. Display 216 may be provided at the rear of the device 202 illustrated in FIG. 3 for user input, information output, and/or targeting.

Example Procedures

In embodiments, memory unit 212 includes instructions that, when executed by processor 218, cause processor 218 to adjust one or more operating parameters and perform a rangefinding operation on a target based, at least in part, on the one or more operating parameters. In the discussion below, the user 102 will be exemplified as a golfer and the target will be exemplified as a flagstick 106 on a golf course, but this is not intended to be limiting. Embodiments may be utilized by any user 102 to perform rangefinding operations using adjusted operating parameters.

Returning to FIG. 1, a user 102 playing a hole of golf may use targeting device 202 to provide a range estimate of the distance to target flagstick 106 on green 104. In general, a rangefinding operation is performed by rangefinder 204 in targeting device 202 by emitting one or more pulses towards target 106 with transmitter 206 and receiving reflections of the one or more pulses from the target using receiver 208. For example, the pulses may provide a visible or infrared laser, which may be projected incident upon a target and reflected back to be captured by the receiver 208. Processor 218 may then calculate a range estimate to the target 106 and display a representation of this estimate to the user 102 on display 216. As further discussed below, the representation of the range estimate displayed on display 216 may include a distance to the target and/or a placement of an image representing the location of the target on a displayed map or image of the scene.

The target flagstick 106 has a small horizontal area for targeting and is, in many cases, a significant distance away from the user 102. For example, the flagstick 106 may only be about 4 centimeters in width, but may be 80 meters away. The result of this geometry is that the rangefinder 204 may capture many reflections of pulses from objects other than target 106, such as foreground tree 110 or background trees 112 illustrated in FIG. 1. These are intended only as examples, and are not limiting. Unwanted reflections may come from any object within a proximity of a line traveled by a "beam" of pulses between transmitter 206 and target 106, objects beyond target 106 in cases where the beam "misses" the intended target flagstick 106, e.g. slightly to the left or right, or optical scattering effects by the atmosphere. Captured reflections from such unintended targets create noise and corresponding incorrect range estimates that must be accounted for by processor 218 to give an accurate range estimation to target 106.

Figure 4:
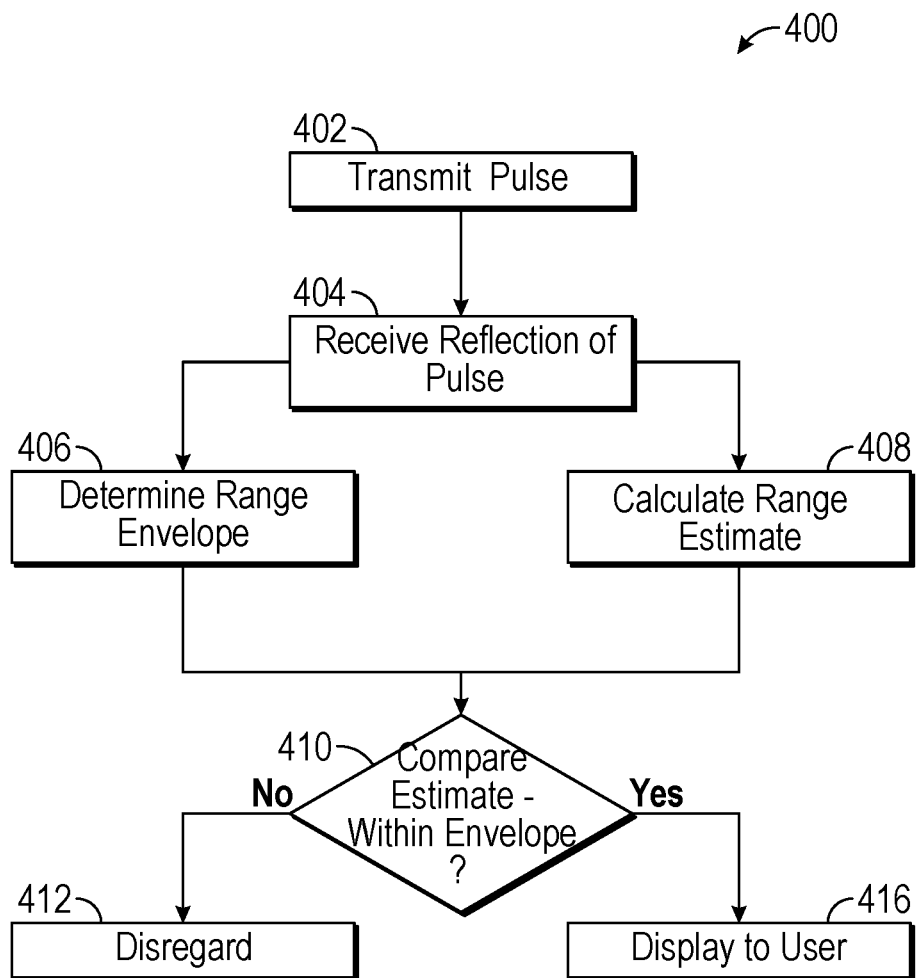
FIG. 4 is an illustration of a first method flow 400, according to an embodiment.

One exemplary method 400 of accounting for reflections from unintended targets is illustrated in FIG. 4. In an embodiment, method 400 may be performed by any suitable combination of one or more processors, applications, algorithms, and/or routines, such as processor 218 executing instructions stored in one or more memory units 212, for example, as discussed above for FIG. 2. Further in accordance with such an embodiment, method 400 may be performed by one or more processors working in conjunction with one or more components within a mobile device, such as one or more processors 218 working in conjunction with one or more of communications module 210, mobile device(s) 250, remote server 260, etc. The steps of method 400 may be performed in any reasonable order. Method 400 is only one example of an embodiment and is not intended to be limiting.

Method 400 begins at step 402, in which transmitter 206 of rangefinder 204 emits a pulse of a laser towards target 106. The laser pulse travels a path from targeting device 202 towards target 106 until it strikes an object, which may be the intended target 106 or an unintended target such as trees 110,112. Regardless of what object is struck, at step 404, receiver 208 of rangefinder 204 captures a reflection of the laser pulse and provides data to one or more processors 218. Processor 218 may then calculate a range estimate based on the provided data, indicative of the range and/or position of the object that was struck by the laser.

In the case where the laser struck the intended target flagstick 106, the rangefinding operation has, at this point, successfully calculated a range estimate of the target that may be displayed to the user 102 via display 216. However, if the laser struck an unintended target, the calculated range estimate will be wrong, and displaying this estimate to the user 102 may cause him to miss badly on a subsequent golf shot. In many cases, a range estimate based on a laser reflection from an unintended target may differ from the actual distance to the intended target by many meters.

If the exact geographic location of the target flagstick 106 could be retrieved from cartographic data 214 stored in memory unit 212, the approximate distance between the targeting device 202 and target flagstick could be calculated based on a sensed geographic location of the device, and range estimates differing from this approximate distance could be simply disregarded by processor 218. Unfortunately, the location of target flagstick 106 usually changes from day to day, as the hole is moved to provide different challenges for golfers. This variable position of the target means that cartographic data 214 stored in memory 212 (and/or retrieved from mobile device 250 or remote server 260), cannot, in such cases, reliably indicate the absolute geographic location of the target flagstick 106.

However, the location of flagstick 106 will always be somewhere on green 104, which does not move. Embodiments make use of this constraint on the possible position of target flagstick 106 by determining, based on cartographic data 214, a range envelope of the target flagstick 106. A range envelope provides an indication of the expected position of a target, and may be defined by a minimum range from the geographic location of the system to the target and a maximum range from the geographic location of the system to the target. In the example situation illustrated in FIG. 1, the range envelope extends from the front 120 of green 104 to the back 130 of green 104. The minimum range could, in an embodiment, be calculated for the illustration of FIG. 1 as the distance between the sensed geographic location of the targeting device 202 of the system 200 and the closest point on the green 120. Similarly, the maximum range could be calculated as the distance between the sensed geographic location of the targeting device 202 of the system 200 and the furthest point on the green 130. These minimum and maximum ranges could then define a range envelope for filtering out bad range estimates using processor 218.

Returning to method 400 of FIG. 4, at step 406 processor 218 determines a range envelope of expected range estimates of the target flagstick 106. In embodiments, step 406 is performed by receiving a sensed geographic location of the system from communications module 210 and finding minimum and maximum ranges for the expected position of the target 106 based on cartographic data 214 stored in memory unit 212. As discussed above, communications module 210 may be operable to sense the geographic location of the system itself, and/or may be operable to communicate with one or more mobile devices 250 to obtain the sensed geographic location of the system.

At step 408, the processor(s) 212 calculates a range estimate of the target based on the laser transmitted and received by rangefinder 204. The range estimate is then compared to the range envelope in step 410. In the embodiment of method 400, the range estimate is disregarded if it does not fall within the range envelope at step 412, and a new measurement may occur. If, however, the range estimate does fall within the range envelope, it may then be displayed to the user via display 216 as a distance measurement and/or indicated position on a map.

The steps of method 400 are only one example of a positioning procedure that embodiments may perform, presented for illustration. In general, in embodiments cartographic data 214 and the geographic location of the system are used to determine a range envelope for a target. Based on the range envelope, at least one operating parameter of the system is then adjusted to improve, speed, and/or support performance of the system. A rangefinder may then be used to perform a rangefinding operation on the target based on the one or more operating parameters.

In embodiments processor 218 may adjust an operating parameter before, during, or after the transmission and reception of a laser pulse, depending on which operating parameter is being adjusted. For example, in the example discussed with regard to method 400, the adjusted operating parameter is the maximum and minimum acceptable distances to a calculated range estimate. In this case, the operating parameter is used after a pulse reflection is received to determine whether or not the resulting range estimate should be disregarded.

In alternative embodiments, the adjusted operating parameter may be the burst rate or power level of the transmitter 206, which may likely be adjusted prior to transmission. For instance, the power level of the transmitter may be increased for a range envelope that is very far away. In yet another embodiment, the measurement period of the rangefinder may be an adjusted operating parameter. This list of operating parameters is not meant to be exhaustive. Any operating parameter such as burst rate of one or more pulses transmitted by transmitter 206, processing gain of processor 218, measurement period, power level of transmitter 206 and/or any other parameter that may advantageously affect the operation of the system may be adjusted. An embodiment may adjust any or all of these operating parameters one or more times to perform a rangefinding operation.

In some embodiments, the system 200 may perform a plurality of range estimates based on many transmissions and/or receptions of pulses by rangefinder 204. In such embodiments, each particular rangefinding operation may produce a single range estimate, which may be disregarded if it calculates a position of the target that is outside the range envelope. Each acceptable range estimate may be stored in memory unit 212 to collect a set of possible range estimates. In some embodiments, the set of range estimates may be averaged to determine a specific range estimate to be displayed to user 102 via display 216. In another embodiment, the range estimate that has been calculated the greatest number of times in the set of range estimates may be displayed to user 102.

In other embodiments, multiple range estimates may be collected until a threshold number of range estimates agree on a specific range estimate, which is then presented to user 102 via display 216. In such an embodiment, the threshold number may be a static value stored in memory unit 212 or may be a value that is determined dynamically based on sensed parameters by processor 218. For instance, the threshold value for range estimates in the set that must agree on a particular range estimate before it is displayed to user 102 may be set very high for a range envelope that is within 20 meters, because at such short range a highly accurate range estimate can both be expected and achieved. This is intended only as one example—any sensed parameter may be used by processor 218 to dynamically select a threshold number of range estimates that must agree before a particular range estimate is displayed to user 102 via display 216.

In another embodiment, range estimates outside the range envelope may not be disregarded by processor 218, but rather included in the set of possible range estimates stored in memory unit 212. In such an embodiment, processor 218 may select a higher threshold number for range estimates outside the range envelope. In this way, a specific range estimate to be displayed to user 102 via display 216 may be outside the calculated range envelope, accounting for inaccuracy in the cartographic data 214 and/or sensed geographic position of the system, but only if the confidence level of that specific range estimate is very high. In this embodiment, the threshold number for range estimates within the range envelope may be much lower, because these estimates fall within the region in which the target is expected to be.

Figure 5:
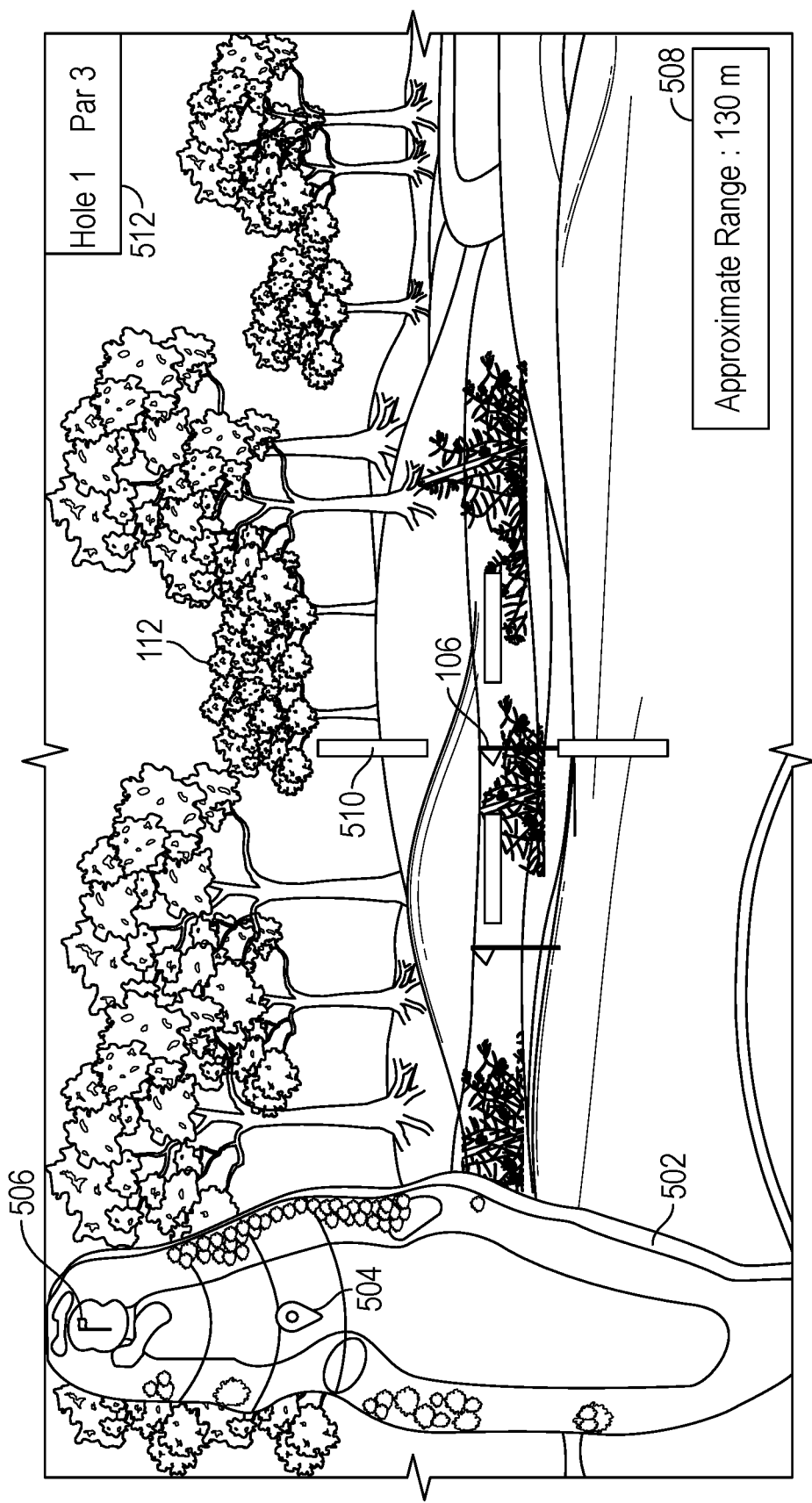
FIG. 5 is a first schematic illustration example of a user interface screens that may be displayed in conjunction with a position and distance measurement system, according to an embodiment.

In embodiments the range estimate may be displayed on a synthetic vision display, such as illustrated on display 216 of FIG. 5. A synthetic vision display may show terrain, obstacles, and other landmarks in their proximity to the user 102. The synthetic vision display shows the terrain as it appears from the user's perspective, such as background trees 112. The synthetic vision display may also assist the user in low-visibility situations, such in foggy conditions or when attempting a blind shot from behind a tree. The synthetic vision may provide an overlaid map 502, presenting, at least in part, information stored in cartographic data 214 for the hole and nearby proximity of the system. The map may include an icon 504 indicating the current sensed geographic location of the system. Once a target position determination has been performed, an indication of the range estimate of the target may be presented on the display to user 102 as pin icon 506 or range estimate 508. These examples are intended neither as exclusive nor limiting. Any representation of the range estimate of the target that may be displayed to a user via display 216 is intended for inclusion within embodiments. In some embodiments, the representation of the range estimate is not overlaid on an image or map, and is merely displayed as an alphanumeric output to the user. In some embodiments, the representation may be displayed to the user via a display of a mobile device 250.

A targeting graphic 510 may be shown on the synthetic vision display so as to supplement the map data and other data that is typically displayed on the synthetic vision display. It should be appreciated that in embodiments, the display 216 may also display known parameters 512 of the target 106, such as the hole number, par, the cardinal direction heading, the altitude, and other parameters. Distances and other measured values may, of course, be presented to the user in any appropriate unit such as meters, feet, yards, etc. As such, the targeting graphic 510 may be displayed on the synthetic vision display as indicative of these parameters. In other embodiments, the system may include a camera 222 for taking a picture or video of the target 106 and displaying these elements along with picture or video on the synthetic vision display.

The display of the picture or video presented to user 102 on display 216 may provide information overlaid on the display 216 assisting a user 102 in locating the target. For example, in the synthetic display illustrated in FIG. 6, an aiming reticle 602 is displayed to user 102, surrounding the location where transmitter 206 will project a pulse when the rangefinder 204 performs a rangefinding operation.

Figure 7:
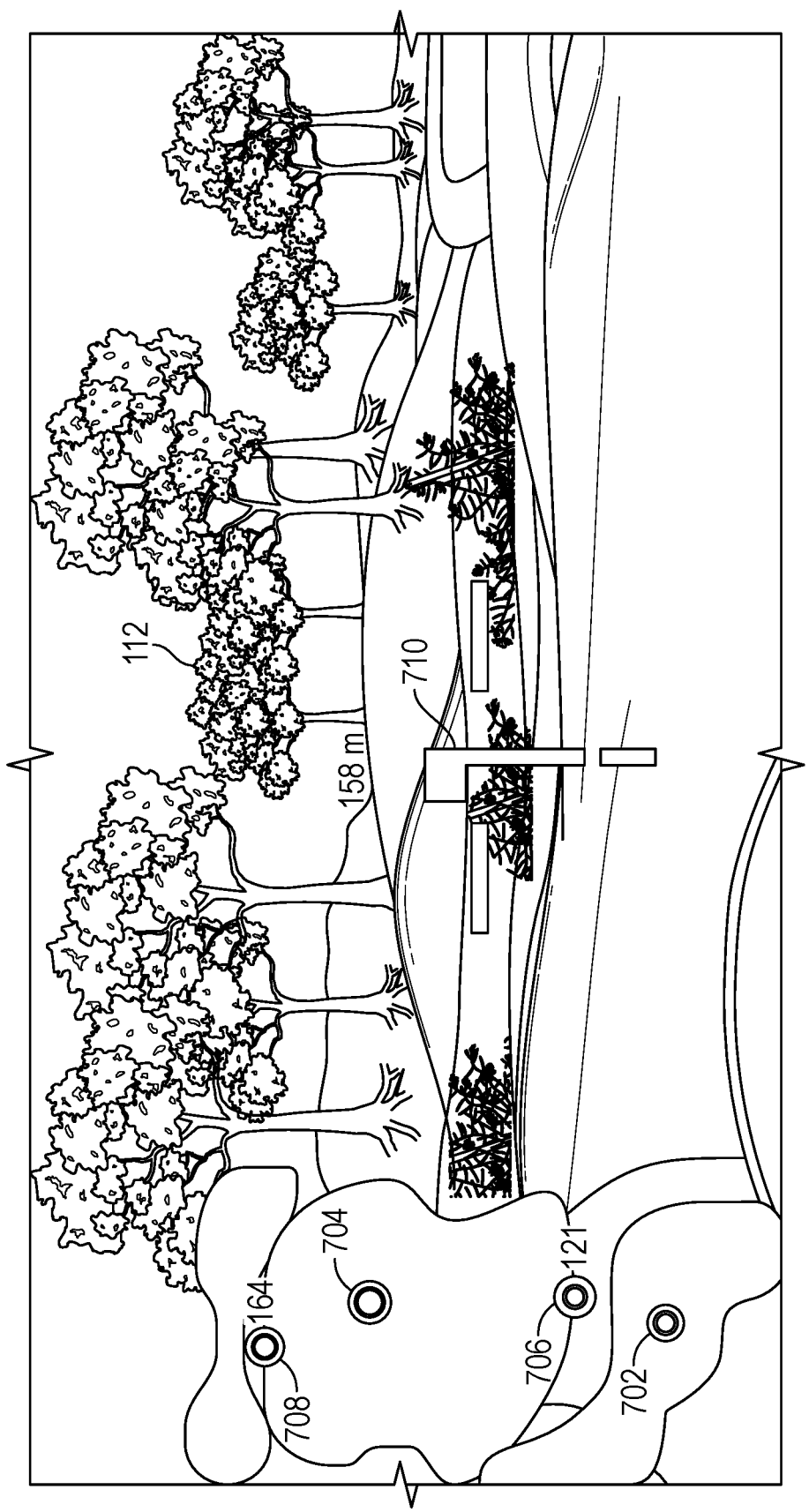
FIG. 7 is a third illustration example of a user interface screens that may be displayed in conjunction with a position and distance measurement system, according to an embodiment.

As seen in FIG. 7, a synthetic display may include an overlaid target assist icon such as flag icon 710 to assist a user 102 in recognizing the location of target flagstick 106 in an image captured by camera 222, as further discussed below. Further, FIG. 7 displays another representation of a range estimate that may be presented to a user 102 on display 216 when a position determination has been performed. Icons 702 and 704 indicate visually to the user the estimated positions of the targeting device 202 and target flagstick 106, respectively. Icons 706 and 708 provide additional information to the user via display 216, that of the approximate locations of the minimum and maximum ranges from the geographic system of green 104, which may define the range envelope. As seen in FIG. 7, the range estimation of "158 m" is displayed above flag icon 710, presenting yet another representation of the range estimate of the target flagstick 106.

It should be appreciated that, as used herein, "icon" and "graphic" may refer to any graphical representation of the respective information. An "icon" or a "graphic" may include graphics, pictures, photographs, words, numbers, symbols, lines, colors, opacity, cross-hatching, and other fill textures and visual representations of information. The "icon" or "graphic" may also change, alter, update, and delete as new information is obtained. For example, flagstick icon 506 and/or range estimate 508 may not appear until a range estimate is calculated. As such, the size, shape, location, orientation, and other aspects of the display may update as this new information is obtained (e.g., as a range estimate is calculated).

Modes of Operation

In embodiments, processor 218 may cause the system, and in particular targeting device 202, to enter a mode of operation in response to an activation. The activation may come from instructions programmed into memory unit 212, a manual input by user 102 through user controls 226 or display 216 (in the case of a touch screen display), and/or may be provided automatically by sensory components of system 200 in response to one or more sensed parameters. Sensed parameters may include the orientation of the system as obtained from orientation determining component 220, camera 222, and/or the geographic location of the system as obtained from communications module 210.

Upon entering a mode of operation, processor 218 may adjust one or more operating parameters, influencing the position determining and range measurement methods disclosed. As previously discussed, such operating parameters may include the processing gain of processor 218, a measurement period, and/or the burst rate or power level of transmitter 206. The operating parameter(s) adjusted may depend on the mode entered, as well as one or more sensed parameters of the system, in embodiments. Further, embodiments may adjust an operating parameter upon entering a mode of operation, and then readjust the same operating parameter based on a range envelope determined based on the geographic location of the system and cartographic data 214. Additionally or alternatively, embodiments may adjust an operating parameter upon entering a mode of operation, and the adjust a different operating parameter based on a range envelope determined based on the geographic location of the system and cartographic data 214. Entering a mode of operation may be done at any point during a rangefinding and position determining process performed by system 200.

For example, processor 218 may use an accelerometer functioning as an orientation determining component 220 in an embodiment to sense that targeting device 202 is being held very still while user 102 uses user controls 226 to cause transmitter 206 in rangefinder 204 to generate pulses of a laser. The accelerometer may, in such a situation, measure a lack of movement in the orientation of the rangefinder except for natural hand jitter of the user 102. Additionally or alternatively, a compass heading sensor and/or inclinometer functioning as orientation determining component 220 may indicate to processor 218 that user 102 has operated the targeting device 202 in a steady, held position for a given amount of time. Processor 218 may, in response to a "holding" sensed orientation from orientation determining component 220, follow instructions stored in memory 212 to cause system 200 to enter a mode of operation known as a holding mode. Alternatively, user 102 may press a button or turn a knob comprising user controls 226 to manually cause system 200 to enter a holding mode.

During a holding mode, the user 102 is presumed to be targeting the target flagstick 106 directly, possibly because the flagstick is nearby and/or visible. In such conditions, processor 218 may perform rangefinding operations with lower power pulses, increased measurement rates, and approximate range data fed directly to display 216, as illustrated in FIG. 5. This is only a single example, and not intended to be limiting. In another embodiment, upon entering a holding mode, processor 218 may adjust operating parameters to increase the beam spread of the rangefinder 204 such that a portion of the beam generated by transmitter 206 is more likely to hit the target flagstick 106. Processor 218 may, in such an embodiment, physically adjust lens assembly 302 to allow more beam smear during a measurement. Additionally or alternatively, the number of integrated pulses per measurement may be decreased by processor 218, lowering processing gain to increase an effective measurement rate of system 200 with a smaller penalty in its sensitivity. In embodiments of system 200, any particular operating parameter may be adjusted upon entering a holding mode of operation to improve, speed, and/or support an estimation of the distance to a target. In particular, upon entering a holding mode, an operating parameter may be adjusted to account for hand movement of a user 102 holding the system 200.

If, instead of a holding state, orientation determining component 220 senses a steady motion of targeting device 202 across a scene, processor 218 may follow instructions stored in memory 212 to cause system 200 to enter a mode of operation known as a scanning mode. Alternatively, user 102 may press a button or turn a knob comprising user controls 226 to manually cause system 200 to enter a scanning mode. A scanning mode may be useful in situations where the target flagstick 106 is difficult to target and/or far away. A user may operate targeting device 202 in a scanning mode to sweep the targeting device 202 across the entire green 104 of a golf hole, intending for the beam generated by rangefinder 204 to, at some point during the sweeping motion, successfully hit the target flagstick 106.

In response to entering a scanning mode, an operating parameter may be adjusted by processor 218 to improve the likelihood that the rangefinder successfully hits the target, and that the reflection from that hit is successfully captured and selected for display to the user 102 via display 216. For instance, in an embodiment, processor 218 may maximize integration time and/or burst repetition rates while in a scanning mode, causing a longer processing delay and power requirement, but a more robust range estimate. Again, this is only one example the manner in which operating parameters that may be adjusted upon entering a scanning mode. Any operating parameter adjusted in any way in response to entering a scanning mode to improve, speed, and/or support an estimation of the distance to a target is intended for inclusion within embodiments. In particular, upon entering a scanning mode, an operating parameter may be adjusted to account for a scanning motion of the system 200.

Figure 6:
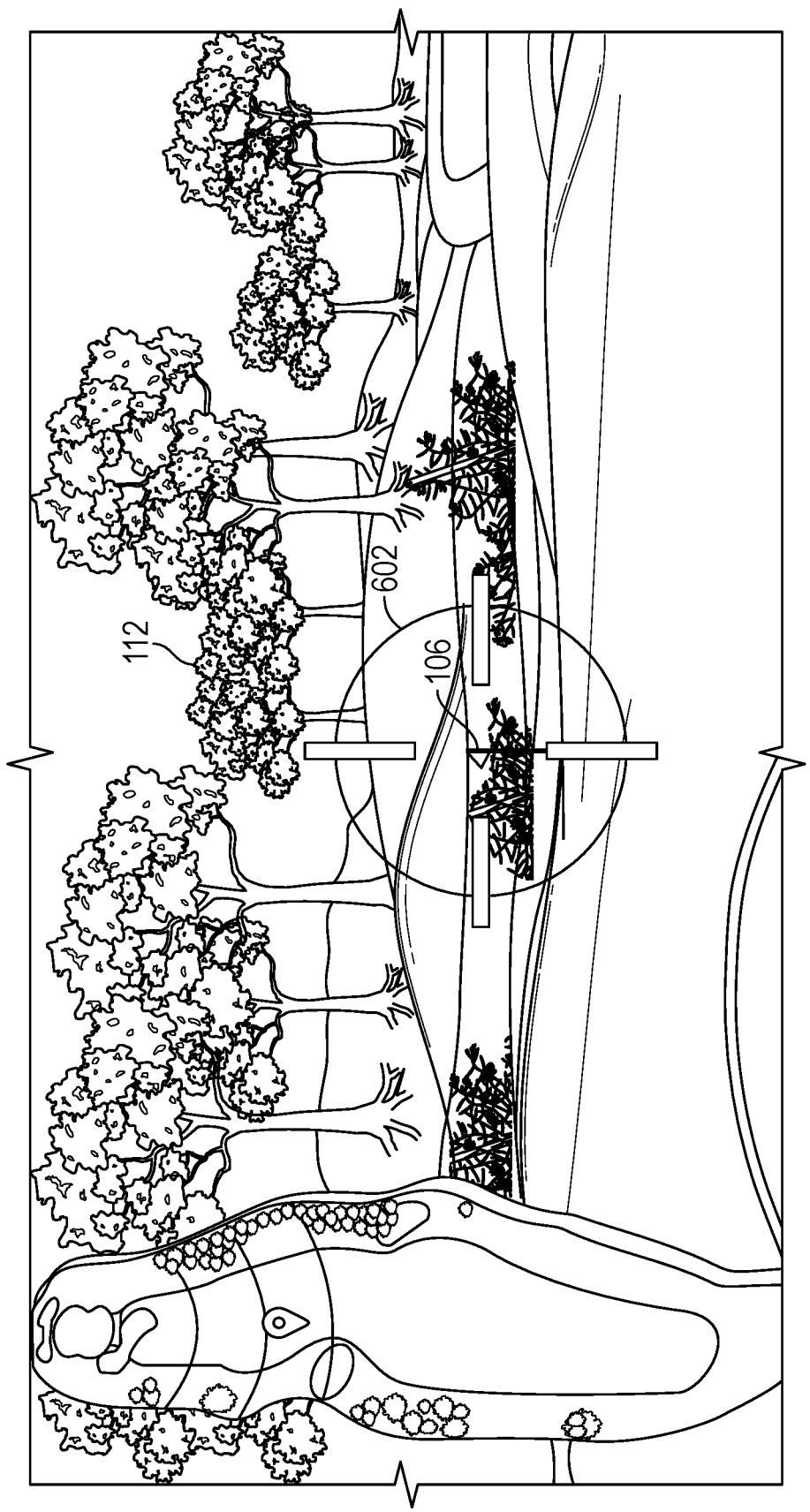
FIG. 6 is a second schematic illustration example of a user interface screens that may be displayed in conjunction with a position and distance measurement system, according to an embodiment.

In an embodiment, processor 218 may cause system 200 to enter a mode of operation constituting an aiming mode, operable to assist user 102 in locating, targeting, and/or successfully hitting target flagstick 106 with one or more pulses from transmitter 206. For example, illustrated in FIG. 6 is a synthetic display that may be displayed to user 102 via display 216 when processor 218 causes system 200 to enter an aiming mode of operation. FIG. 6 is only one example, and is not intended to be limiting. Aiming reticle 602 is presented, overlaid on an image captured by camera 222 to assist user 102 in finding target flagstick 106 in the midst of other objects, and possibly from a great distance. In some embodiments, the image presented to user 102 via display 216 may be zoomed by processor 218 relative to the actual image captured by camera 222. In another embodiment, processor 218 may steer aiming reticle 602 and/or the scene imaged by camera 222 in a direction relative the actual transmitter 206 pointing orientation based on accelerometer data of the targeting device 202. This may imperceptibly drive the user 102 to aim the targeting device closer towards the location of the target flagstick 106. Non-uniformity in the distribution of tremor-induced angular movement in azimuth and elevation as sensed by orientation determining component 220 relative to the center axis could be accumulated from previous uses in memory 212 to optimize the pointing orientation, making this method for appropriately usable with shorter effective measurement times.

In another embodiment, processor 218 may cause system 200 to enter a mode of operation known constituting a target seek mode. Target seek mode may be initiated, for example, by the holding down of a measurement button on user controls 226 for an extended period. Alternatively or additionally, target seek mode may be entered automatically by processor 218 based on a combination of a cartographic data 214 from memory unit 212, sensed geographic location provided by communications module 210, and a sensed orientation of the targeting device 202 from orientation determining component 220. For example, based on cartographic data 214 related to a hole and the sensed geographic location from communications module 210, processor 218 may be able to conclude the direction targeting device 202 must point to perform a rangefinding operation on target flagstick 106. Thereafter, if data from the orientation determining component 220 indicates that targeting device 202 is pointed in this direction, processor 218 may automatically cause system 200 to enter a target seek mode.

As before, entering target seek mode adjusts an operating parameter to improve, speed, and/or support performance of the system. For instance, measurement rate may be increased to improve the likelihood that a valid distance is obtained as the transmit beam of pulses sweeps across flagstick 106 due to hand shake and/or the natural sweep of the beam as the user 102 sights to the target. Adjusted parameters may be any of those described above or any others that may be useful in assisting in identification of target flagstick 106.

Upon entering target seek mode, processor 218 may additionally capture, using camera 222, an image of the proximity of target flagstick 106 and search pixels of the image for information indicative of target flagstick 106. For example, video processing by processor 218 of a central grouping of pixels captured by camera 222 can be used to identify and locate the flag and pole, providing a steady anchor for any superimposed display information on display 216 and helping to steer the user 102 into the flag location if there is an angular bias between apparent azimuth and elevation to the flag location and the actual line-of-sight of the rangefinder. In some embodiments, processor 218 may capture the location of target flagstick 106 by processing pixels in an image captured by camera 222 and display a flag icon 710 overlaid on the image on display 216. This may be particularly useful for assisting the user 102 in targeting during dark, misty, or foggy conditions. Overlaying a flag icon 710 may indicate a "pin lock" condition, that processor 218 has confidently located the target flagstick 106 and is prepared to make or has made an accurate range estimate. Once a pin lock condition is reached, if a user control 226 button remains depressed, processor 218 may cause labels, icons, or other graphics displayed on display 216 to remain fixed firmly in place even if user 102 scans the rangefinder away from the flagstick 106 to view other locations on the green 104.

Flag icon 710 is only one example of a target assist icon that may be presented to the user 102 while in target seek mode. Additionally or alternatively, a cross-hair icon or reticle such as aiming reticle 602 could be presented to user 102 on display 216 to assist in finding and targeting flagstick 106. In some embodiments, processor 218 may use the cartographic data 214, sensed geographic location of the system, and orientation data of the system to display a target assist icon on display 216 indicative of a direction to turn the device towards the target. For instance, given a known location and heading on a golf course from communications module 210 and orientation determining component 220, processor 218 could be operable to determine that a user 102 is pointing a targeting device too far to the left to be able to successfully perform a rangefinding operation on the target. Processor 218 may then be operable to display an arrow pointing to the right on display 216, informing the user that they should point targeting device further to the right. The arrow constitutes a target assist icon, which in embodiments may be flashing, colored, or presented in any other attention-grabbing form.

In some embodiments, a spatial filtering algorithm may be employed and may be optimized based on the range envelope. As a particular example, the sharp vertical and angular outline of the pole and flag of flagstick 106 may be distinctive spatially relative to the softer gradations and curved shapes of the natural background. A 0.75 inch diameter, 6 foot tall flag pole at 250 yards provides a subtended azimuth angle of roughly 80 microradians and an elevation angle of 7.8 milliradians. Assuming approximately 480 camera pixels for a 6-degree field of view (FOV), a FOV per pixel is 200 microradians. Thus, a one or two pixel wide vertical line roughly 40 pixels tall of flagstick 106 would be seen by camera 222.

This rectangular block of pixels surrounding the center of the target field may then be processed to create high contrast and to emphasize distinguishing spatial characteristics between the flagstick 106 and the background scene First, the scene is processed to remove the dominate scene color (likely green) to improve contrast between the background and the normally distinguishing pole and flag color. The image is then converted to grayscale to simplify downstream convolutional processing. The block of data is then spatially filtered using a convolution operator to accentuate narrow vertical features in the scene followed by a thresholding operation to eliminate background clutter and pixel noise. Finally the image block is processed using convolution using an edge detection operator with an associated detection criteria based on the degree of match between shapes in the field and the expected shape. The detection criteria could be based on distance because the maximum height of the pole relative to the horizon is known, and thus the criteria needed to calculate its vertical pixel extent. In most cases, the pixel subregion could be limited to a less than 10 pixels wide by 100 pixels tall, taking into account the presence of pointing uncertainty and hand jitter relative to targeting graphic 510.

Figure 8:
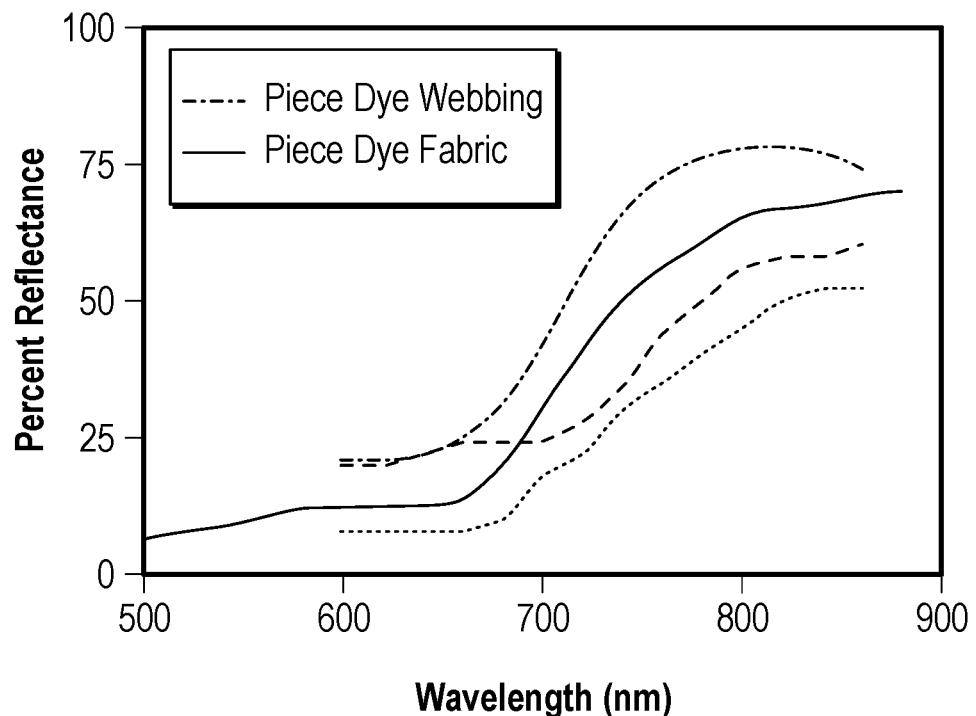
FIG. 8 illustrates the reflectivity of common terrestrial materials likely to encountered around the golf course.
Figure 8:
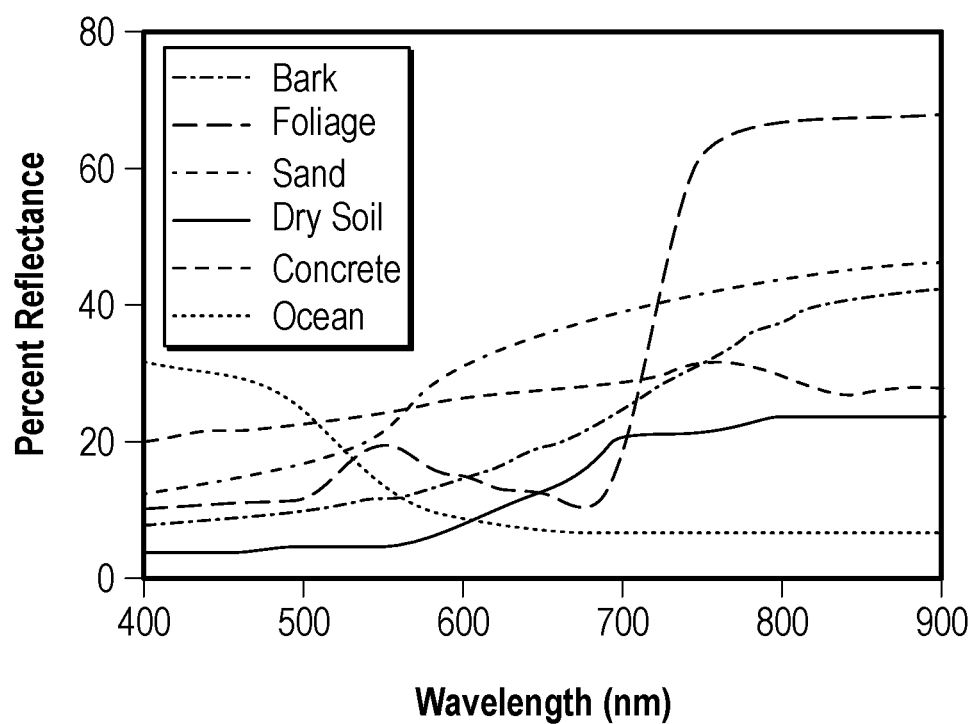

Embodiments may use reflectivity to improve the accuracy of position determinations. As shown in FIG. 8, the reflectivity of common terrestrial materials likely to encountered around the golf course and their dependence on optical wavelength may be stored in memory unit 212 of the targeting device 202. In embodiments, the reflectivity of such materials may be used by processor 218 to select a wavelength for transmission by transmitter 206 or determine a successful capture of an optical reflection from a target flagstick 106.

While reference has been made above to the various components and techniques of embodiments, the description that follows will provide further examples systems and processes that may be added in embodiments. The description below is intended to merely exemplify steps that may be taken in practice of operation of the embodiments and is not intended to be limiting. Steps that may be performed in practice of some embodiments are illustrated in FIG. 9 and herein described.

Figure 9:
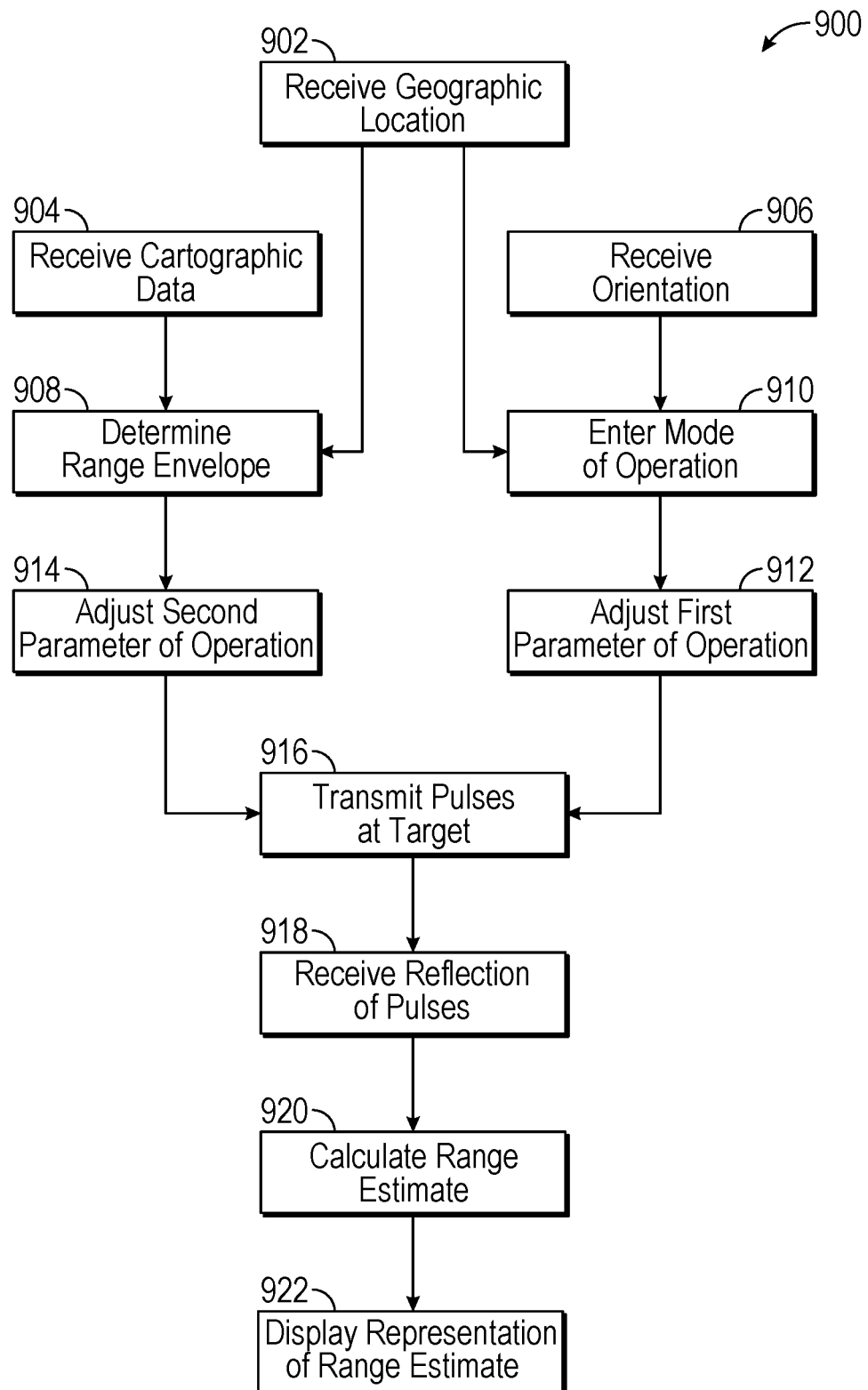
FIG. 9 illustrates a method flow 900, according to an embodiment.

Turning now to FIG. 9, a flowchart illustrating the operation of a method for determining a position of a target is depicted and referred to generally by reference numeral 900. At step 902, processor 218 receives the geographic location of the system from communications module 210. As discussed above, communications module 210 may be a GPS receiver, operable to sense the geographic location of the system itself, and/or may be operable to communicate with one or more mobile devices 250 to obtain the sensed geographic location of the system. At step 904, the system 200 retrieves cartographic data 214 for the sensed geographic location, which may already be stored in memory 212 or may be requested from mobile device 250 and/or remote server 260. At step 906, the processor 218 receives orientation data of the system from orientation determining component 220. Steps 902, 904, and 906 may be performed in any order or simultaneously, though in most cases it is envisioned that reception of the geographic location in step 902 would be performed prior to retrieval of cartographic data 214 in step 904.

Similarly, steps 908 and 910 may be performed in any order or simultaneously. At step 908, processor 918 uses the geographic location of the system and the cartographic data 214 to determine a range envelope for the target, such as target flagstick 106. The range envelope may be defined by a minimum range from the geographic location of the targeting device 202 and a maximum range from the geographic location of the targeting device 202. In step 910, processor 218 causes system 200 to enter a mode of operation, which may be in response to the sensed orientation of the system and sensed geographic location of the system. In some embodiments, entering a mode of operation may further or alternatively be in response to a manual activation by a user and/or an image captured by camera 222 and subsequently processed by processor 218. In response to entering a mode of operation, at step 912 a first operating parameter is adjusted based on the entered mode. Similarly, in step 914 a second operating parameter is adjusted in response to the determined range envelope. The first and second operating parameters may be the same or distinct operating parameters in embodiments, and in the case of distinct parameters may be adjusted in any order.

Transmitter 206 in rangefinder 204 then transmits one or more pulses as a beam of light towards target flagstick 106 in step 916. In step 918, reflections of the pulses are received by receiver 208 and provided to processor 218. Processor may then calculates a range estimate in step 920, completing a rangefinding operation. The rangefinding operation is based, at least in part, on the first and second operating parameter adjustments. A representation of the range estimate is then displayed to a user 102 in step 922, and in some embodiments may be stored in memory unit 212.

It should be appreciated that, while the above disclosure is directed mainly to the field of golf, some embodiments may be employed for any field requiring accurate distance measurement to a target that is located in a known area. Embodiments and techniques may be used in any setting or field, such as hunting, aeronautics, and archery. Embodiments and techniques may be particularly applied to military applications, such as targeting munitions at a target within an area having known dimensions and position. The golf field discussed is merely exemplary and should not be construed as limiting.

Although systems and methods for assisting a user with determining the distance to a target golf flagstick 106 have been disclosed in terms of specific structural features and acts, it is to be understood that the appended claims are not to be limited to the specific features and acts described. Rather, the specific features and acts are disclosed as exemplary forms of implementing the claimed devices and techniques.

The invention claimed is:

1. A system for determining a range estimate to a target comprising:
    a rangefinder including:
        a transmitter operable to emit one or more pulses towards the target, and
        a receiver operable to receive reflections of the one or more pulses;
    a communications module operable to obtain a geographic location of the system;
    a memory unit storing a set of cartographic data;
    a display; and
    at least one processor operable to:
        obtain, from the communications module, the geographic location of the system;
        determine a range envelope of the target based on the geographic location of the system and the set of cartographic data;
        adjust an operating parameter of the system based on the range envelope, wherein the operating parameter includes a processing gain;
        calculate a range estimate of the target by performing, using the rangefinder, a rangefinding operation based, at least in part, on the operating parameter; and
        display, on the display, a representation of the range estimate of the target.

2. The system of claim 1, wherein the target is a golf flag or flagstick.

3. The system of claim 1, wherein the range envelope is defined by a minimum range from the geographic location of the system and a maximum range from the geographic location of the system.

4. The system of claim 1, wherein the representation of the range estimate of the target is a distance to the target or an indication of a location of the target on a map.

5. The system of claim 1, further including an orientation determining component for sensing an orientation of the system, and wherein the at least one processor includes an aiming mode for assisting a user in aiming the rangefinder at the target based on the orientation of the system and the geographic location of the system.

6. The system of claim 1, further including an orientation determining component for sensing an orientation of the system, and wherein the orientation determining component is selected from the group consisting of an inclinometer, a compass heading sensor, a gyroscope, and an accelerometer.

7. The system of claim 1, wherein the range estimate of the target is a first range estimate of the target, and wherein the at least one processor is further operable to:
    calculate a plurality of additional range estimates of the target using the rangefinder;
    collect the first range estimate of the target and the plurality of additional range estimates of the target as a set of possible range estimates; and
    conclude a final range estimate of the target when at least a threshold number of the set of possible range estimates indicates a specific range estimate of the target.

8. The system of claim 7, wherein a particular range estimate of the set of possible range estimates is disregarded if it does not fall inside the range envelope.

9. The system of claim 7, wherein the at least one processor automatically determines a value for the threshold number.

10. The system of claim 1, wherein the communications module is a GPS receiver.

11. The system of claim 1, wherein the communications module obtains the geographic location of the system from a mobile electronic device.

12. A system for determining a range estimate to a target comprising:
    a rangefinder including:
        a transmitter operable to emit one or more pulses towards the target, and
        a receiver operable to receive reflections of the one or more pulses;
    a communications module operable to obtain a geographic location of the system;
    a memory unit storing a set of cartographic data;
    a display; and
    at least one processor operable to:
        obtain, from the communications module, the geographic location of the system;
        enter a mode of operation;
        adjust a first operating parameter of the system based on the mode of operation;
        determine a range envelope of the target based on the geographic location of the system and the set of cartographic data;
        adjust a second operating parameter of the system based on the range envelope, wherein the second operating parameter includes a processing gain;

calculate a range estimate of the target by performing, using the rangefinder, a rangefinding operation based, at least in part, on the first and second operating parameters; and display, on the display, a representation of the range estimate of the target.

13. The system of claim 12, wherein the mode of operation is a scanning mode and the first operating parameter is adjusted to account for a scanning motion of the system.

14. The system of claim 12, wherein the mode of operation is a holding mode and the first operating parameter is adjusted to account for hand movement of a user holding the system.

15. The system of claim 12, wherein the mode of operation is a target track mode and the first parameter is adjusted to assist in identification of the target.

16. The system of claim 12, further including an orientation determining component for sensing an orientation of the system, and wherein the step of entering the mode of operation is performed automatically by the at least one processor based on the orientation of the system or the geographic location of the system.

17. A system for determining a range estimate to a target comprising:
   a rangefinder including:
     a transmitter operable to emit one or more pulses towards the target, and
     a receiver operable to receive reflections of the one or more pulses;
   a communications module operable to obtain a geographic location of the system;
   an orientation determining component;
   a memory unit storing a set of cartographic data;
   a display; and
   at least one processor operable to:
     obtain, from the communications module, the geographic location of the system;
     sense, using the orientation determining component, an orientation of the system;
     enter a target seek mode based on the geographic location of the system and the orientation of the system;
     adjust a first operating parameter of the system based on the target seek mode;
     determine a range envelope of the target based on the geographic location of the system and the set of cartographic data;
     adjust a second operating parameter of the system based on the range envelope, wherein the second operating parameter includes a processing gain;
     calculate a range estimate of the target by performing, using the rangefinder, a rangefinding operation based, at least in part, on the first and second operating parameters; and
     display, on the display, a representation of the range estimate of the target.

18. The system of claim 17,
further comprising a camera; and
wherein the at least one processor is further operable to:
   capture, using the camera, an image of the proximity of the target,
     wherein the image of the proximity of the target includes a plurality of pixels; and
   search the plurality of pixels for information indicative of the target while in the target seek mode.

19. The system of claim 17, wherein the at least one processor is further operable to display a target assist icon on the display while in the target seek mode.

* * * * *